(12) United States Patent
Asbahr et al.

(10) Patent No.: US 7,335,693 B2
(45) Date of Patent: Feb. 26, 2008

(54) ANTIOXIDANTS FOR POLYAMIDES

(75) Inventors: Hark-Oluf Asbahr, Goennheim (DE); Thomas Bomba, Roedersheim-Gronau (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/483,262

(22) PCT Filed: Jul. 11, 2002

(86) PCT No.: PCT/EP02/07718

§ 371 (c)(1), (2), (4) Date: May 24, 2004

(87) PCT Pub. No.: WO03/008492

PCT Pub. Date: Jan. 30, 2003

(65) Prior Publication Data

US 2004/0192821 A1  Sep. 30, 2004

(30) Foreign Application Priority Data

Jul. 14, 2001 (DE) ............................. 101 34 327

(51) Int. Cl.
*C08K 5/13* (2006.01)
(52) U.S. Cl. ..................................... 524/324; 524/351

(58) Field of Classification Search ................ 524/324, 524/351

See application file for complete search history.

(56) References Cited

U.S. PATENT DOCUMENTS

| | | | | |
|---|---|---|---|---|
| 4,210,577 A | * | 7/1980 | Minagawa et al. | 524/100 |
| 4,222,931 A | * | 9/1980 | Minagawa et al. | 524/102 |
| 4,371,647 A | * | 2/1983 | Minagawa et al. | 524/120 |
| 4,481,317 A | * | 11/1984 | Nakahara et al. | 524/119 |
| 4,624,679 A | * | 11/1986 | McEntee | 8/650 |
| 4,670,492 A | * | 6/1987 | Nakahara et al. | 524/119 |
| 5,322,734 A | * | 6/1994 | Lynch | 428/349 |
| 5,670,255 A | * | 9/1997 | Temple et al. | 428/392 |
| 5,874,497 A | | 2/1999 | Wolgang et al. | |
| 6,001,957 A | * | 12/1999 | Puyenbroek et al. | 528/332 |
| 6,353,050 B1 | * | 3/2002 | Bastiaens et al. | 524/538 |
| 2004/0048016 A1 | * | 3/2004 | Wang et al. | 428/35.7 |
| 2005/0153136 A1 | * | 7/2005 | Guschi | 428/403 |

* cited by examiner

*Primary Examiner*—Peter Szekely
(74) *Attorney, Agent, or Firm*—Oblon, Spivak, McClelland, Maier & Neustadt, P.C.

(57) ABSTRACT

The invention relates to an antioxidant for polyamides containing a sterically hindered phenol of formula (I) as a single primary antioxidant, wherein n is a mixture of whole numbers from 1-5. The invention also relates to compositions containing a polyamide and a compound of formula (I) as a single primary antioxidant.

13 Claims, No Drawings

ANTIOXIDANTS FOR POLYAMIDES

BACKGROUND OF THE INVENTION

Field of the Invention

The present invention relates to a sterically hindered phenol as an antioxidant for polyamides as well as compositions containing a polyamide and a sterically hindered phenol.

In the processing and manufacture of thermoplastic polyamide semi-finished products and end products by extrusion, injection moulding, etc. antioxidants have to be added to the plastics to prevent the plastics discoloring or their mechanical properties, such as impact resistance, embrittlement resistance, tear resistance, etc. being impaired by the decomposition processes that occur. The same applies to the storage and use of the end products.

The decomposition mechanism has not yet been completely explained, however, it is assumed that energy input and oxygen cause radicals, in particular peroxide radicals, to form, which propagate radical decomposition and oxidation via the respective mechanisms of chain propagation and chain branching.

To prevent this, antioxidants are added. In principle, these can be split into two groups. Especially important are the radical scavengers, preferably sterically hindered phenols, which, on the one hand, trap radicals by transferring a hydrogen radical, which causes the formation of a stabilised phenol radical from the phenol, and, on the other hand, also trap a second radical through addition of this stabilised phenol radical to the second radical. This group is known as primary antioxidants.

So-called secondary antioxidants are also used. These directly decompose hydroperoxide groups by reduction without producing new radicals. Typical for this group are phosphites and organic sulphides, in particular thioesters (Taschenbuch der Kunststoff-Additive, $3^{rd}$ edition (1989)).

In general, a system of different stabilisers is used with the aim of creating a synergistic effect, but this is not absolutely necessary. For polyamide the most common non-colouring antioxidant used at present is Irganox 1098 from Ciba, a dimeric phenol with the following formula:

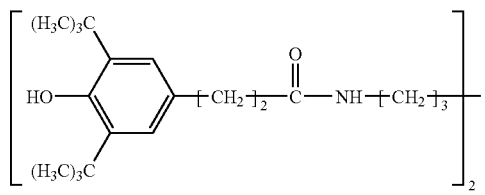

Another known antioxidant for polyamide is Irganox 254:

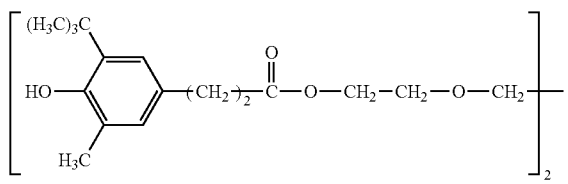

Gächter/Müller, "Kunststoffadditive", 3rd edition 1990, Hanser Verlag Munich, Vienna, for example, contains an overview of various antioxidants.

The use of a sterically hindered phenol of Formula I

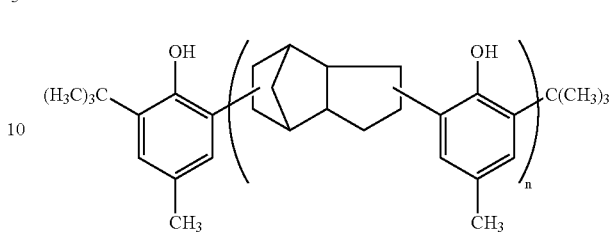

in a combination with thioesters and phosphites as an anti-ageing agent for co- and terpolymers of styrene is described in DE 197 50 747.

A stabiliser mixture of two sterically hindered phenols, which could also be used for polyamides and copolyamides, is known from EP 669 376 A1. The only example relates to the stabilisation of acrylonitrile-butadiene-styrene terpolymer with a mixture of

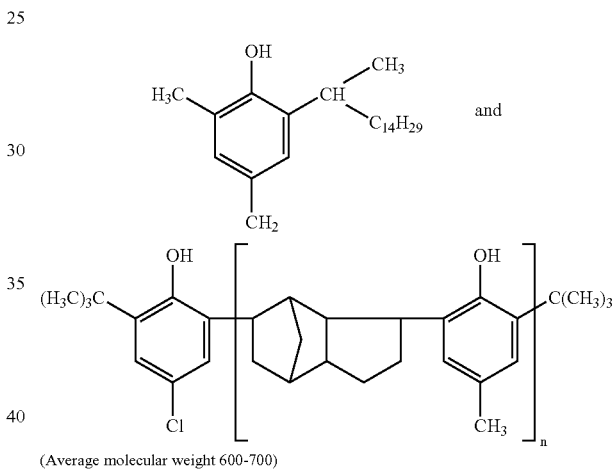

(Average molecular weight 600-700)

Although a large number of antioxidants for polyamides are known, there is still a demand for improved and, in particular, more effective and more cost-effective stabilisers. The task of the present invention is to find improved active ingredients.

Surprisingly it was found that a sterically hindered phenol of Formula I:

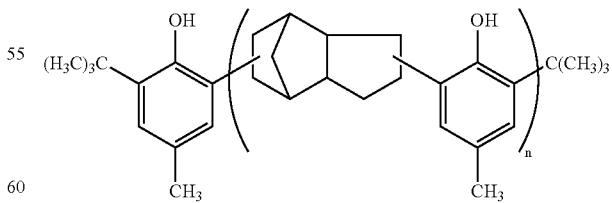

where n=1-5, as the sole primary antioxidant for polyamides exhibits a much improved antioxidative effect compared to conventional antioxidants.

Therefore, the solution to the task is an antioxidant for polyamides which contains a compound of the above Formula I as the sole primary antioxidant as well as compositions that contain a polyamide and a compound of Formula I as the sole primary antioxidant.

A total of 0.01 to 5% by weight, preferably 0.1 to 3% by weight of the compound, in relation to the polymer, is used.

The compound of Formula I can be obtained from Raschig GmbH, Ludwigshafen under the brand name of RALOX® LC. RALOX® LC(CAS No. 68610-51-5 butylated reaction from p-cresol and dicyclopentadiene) is produced by the Friedel-Crafts reaction of p-cresol and tricycle-[5.2.1.0]-decadiene in a molar ratio of 10:1 to 1:5 and subsequent conversion with 2-methylpropene, or tertiary butanol, or tertiary butyl chloride.

The product is a mixture of the oligomers where n=1-5.

Depending on the molar ratio of the starting products and the mixing ratio of "n", the compounds have a melting point between 70 and 140° C. and an average molecular weight of 600 to 800 g/mole. They are not readily volatile, have good compatibility, a low level of migration and high extraction resistance.

As polyamides it would be possible, according to the present invention, to use polyamides and copolyamides which are derived from diamines and dicarboxylic acids or the respective lactams, such as polyamide 4, polyamide 6, polyamide 6/6, polyamide 6/10, polyamide 6/8, polyamide 6/12, polyamide 4/6 polyamide 11, polyamide 12. Also conceivable are aromatic polyamides derived from m-xylene, diamine and adipic acid, polyamides manufactured from hexamethylene diamine and iso- and/or terephthalic acid and, if required, an elastomer as modifier, e.g. poly-2,4,4-trimethyl hexamethylene terephthalamide, poly-m-phenylene isophthalamide, block copolymers of the above-mentioned polyamides with polyolefins, olefin copolymers, ionomers or chemically bonded or grafted elastomers, or with polyether, such as with polyethylene glycol, polypropylene glycol or polytetramethylene glycol, or with EPDM or ABS-modified polyamides or copolyamides and during the processing of condensed polyamides ("RIM polyamide systems").

Masses of the above-mentioned thermoplastics, which are the subject of the present invention and which are stabilised against discoloration and thermal and oxidative decomposition, can be produced as follows:

The plastic granulate and the phenolic antioxidant are mixed with each other at room temperature, for example in a drum-hoop mixer, and extruded via a synchronous-run twin-screw kneader at the melting temperature of the plastic. After being extruded, the melt is cooled in a water bath then granulated and dried. The semi-finished product that has been produced in this manner can be further processed in the usual manner without additional stabilisation.

If required, other conventional additives such as secondary antioxidants, UV absorbents and light stabilizers, metal deactivators, fillers and reinforcing agents, plasticizers, lubricants, emulsifiers, pigments, optical brighteners, flame retardants, antistatic agents and/or blowing agents can also be added.

Preferred secondary antioxidants include:
1.1 Alkylthiomethyl phenols:
e.g.
2,4-Di-octylthiomethyl-6-tert-butylphenol
2,4-Di-octylthiomethyl-6-methylphenol
2,4-Di-octylthiomethyl-6-ethylphenol
2,6-Di-dodecylthiomethyl-4-nonylphenol
1.2 Hydroxylated thiodiphenylethers:
e.g.
2,2'-Thio-bis-(6-tert-butyl-4-methylphenol)
2,2'-Thio-bis-(4-octy!phenol)
4,4'-Thio-bis-(6-tert-butyl-3-methylphenol)
4,4'-Thio-bis-(6-tert-butyl-2-methylphenol)
4,4'-Thio-bis-(3,6-di-sec.-amylphenol)
4,4'-Bis-(2,6-di-methyl-4-hydroxyphenyl)-disulphide
1.3 Phosphites and Phosphonites
e.g.
Triphenyl phosphite
Diphenylalkyl phosphites
Phenyldialkyl phosphites
Tris-(nonylphenyl)-phosphite
Trilauryl phosphite
Trioctadecyl phosphite
Distearyl-pentaerythrite diphosphite
Tris-(2,4-di-tert-butylphenyl)-phosphite
Diisodecylpentaerythdte-diphosphite
Bis-(2,4-di-tert-butylphenyl)-pentaerythdte diphosphite
Bis-(2,6-di-tert-butyl-4-methylphenyl)-pentaerythrite diphosphite
Bis-isodecyloxy-pentaerythdte diphosphite
Bis-(2,4-di-tert-butyl-6-methylphenylrpentaerythrite diphosphite
Bis-(2,4,6-tri-tert-butylphenyl)-pentaerythrite diphosphite
Tristearyl-sorbit-triphosphite
Tetrakis-(2,4-di-tert-butylphenyl)-4,4'-biphenylene-diphosphonite
6-Isooctyloxy-2,4,8,10-tetra-tert-butyl-12H-dibenz[d,g]-1,3,2-dioxaphosphocine
6-fluoro-2,4,8,10-tetra-tert-butyl-12-methyl-dibenz[d,g]-1,3, 2-dioxaphosphocine
Bis-(2,4-di-tert-butyl-6-methylphenyl)-methyl phosphite
Bis-(2,4-di-tert-butyl-6-methylphenyl)-ethyl phosphite
1.4 Peroxide-Destroying Compounds e.g.
Esters of β-Thio-dipropionic acid, for example lauryl, stearyl, myristyl or tridecyl esters
Mercaptobenzimidazole
The zinc salt of 2-Mercaptobenzimidazole
Zinc-dibutyl-dithiocarbamate
Dioctadecyldisulphide
Pentaerythrit-tetrakis-(β-dodecylmercapto)-propionate
1.5 Polyamide Stabilisers
e.g.
Copper salts in combination with iodides and/or phosphorus compounds and salts of divalent manganese.

In the following examples, evidence of the superiority of the antioxidant that is the subject of the present invention compared to media known from the state-of-the-art will be given.

EXAMPLE 1

Stabilisation of Polyamide 6

The antioxidative effect was determined via thermal analysis using dynamic DSC. The method is described, for example, in Widmann/Riesen, "Thermoanalyse", Huthig Buch Verlag Heidelberg, $3^{rd}$ edition 1990, p. 63. A Mettler DSC 20 with automatic tangent evaluation was used. The heating rate was 20° C. per minute; each sample weighed approx. 10 mg. The results are listed in Table 1. All percentages refer to the weight.

TABLE 1

| No. | Antioxidant | Formula | Onset temp. |
|-----|-------------|---------|-------------|
| 1 | Without (control) | | 293 |
| 2 | 1% Ralox BHT | (2,6-di-tert-butyl-4-methylphenol structure) | 295 |
| 3 | 1% Ralox 46 | (methylene-bis(2-tert-butyl-4-methylphenol) structure) | 297 |
| 4 | 1% Ralox 53O | (2,6-di-tert-butyl-4-(propanoic acid octadecyl ester)phenol structure) | 300 |
| 5 | 1% Irganox 1098 | ([3,5-di-tert-butyl-4-hydroxyphenyl-(CH$_2$)$_2$-C(O)-NH-(CH$_3$)$_3$-]$_3$ structure) | 301 |
| 6 | 1% Irganox 245 | ([3-tert-butyl-5-methyl-4-hydroxyphenyl-(CH$_2$)$_3$-C(O)-O-CH$_2$-CH$_2$-O-]$_3$ structure) | 301 |
| 7 | 1% Ralox LC | (oligomeric di-tert-butyl-methylphenol with dicyclopentadiene bridge structure) | 307 |

It can be seen from the measured values in Table 1 that the Ralox® LC according to the present invention is superior to the antioxidants for polyamides (Irganox 1098, Irganox 245 . . . ) that were previously used.

EXAMPLE 2

In this series of measurements the effect of the compound that is the subject of the present invention was compared with the stabilisers known from EP 699 367. As the pure 2-(1-methylpentadecyl)-4,6-dimethyl phenol is not commercially available, the mixture of approx. 80% phenol and 20% 2,6-Di-tert,-butyl-4-propionic acid octadecylester marketed by Ciba for styrene polymers under the brand name of Irganox 1141 was used.

The investigations were carried out in the same manner as in Example 1. The results are listed in Table 2.

TABLE 2

| No. | Antioxidant | Formula | Onset temp. |
|---|---|---|---|
| 9 | Without (control) | | 291 |
| 10 | 1% Ralox LC | (structure) | 312 |
| 11 | 1% Irganox 1141 | 80% (structure); 20% (structure) | 309 |
| 12 | 0.5% Ralox IC 0.5% Iranox1141 | | 302 |

Surprisingly it can be seen that the compound that is the subject of the present invention (No. 10) exhibits a better antioxidative effect compared to the combination known from EP 699 367 A1 (No. 12) and also compared to Irganox 1141 (No. 11). The combination even exhibits a worse antioxidative effect for polyamide than Irganox 1141. This is especially surprising, as in many cases synergistic effects occur when stabilisers are combined.

The invention claimed is:

1. A composition comprising a polyamide and 0.01 to 5% by weight of at least one antioxidant based on the total mass of the polyamide, wherein the antioxidant consists of a sterically hindered phenol of formula:

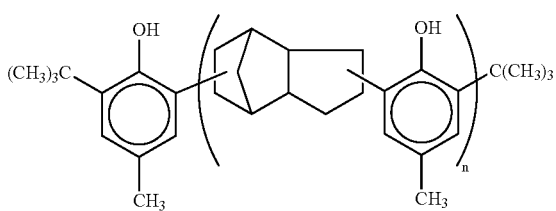

wherein n is from 1 to 5.

2. The composition as claimed in claim 1, wherein the antioxidant is present in an amount of between 0.1 and 3% by weight based on the total mass of the polyamide.

3. The composition as claimed in claim 1, wherein n is 1.

4. The composition as claimed in claim 1, wherein n is 2.

5. The composition as claimed in claim 1, wherein n is 3.

6. The composition as claimed in claim 1, wherein n is 4.

7. The composition as claimed in claim 1, wherein n is 5.

8. The composition as claimed in claim 1, wherein the polyamide is a thermoplastic.

9. The composition as claimed in claim 1, wherein the polyamide is a copolyamide.

10. The composition as claimed in claim 1, wherein the polyamide comprises at least one of polyamide 4, polyamide 6, polyamide 6/6, polyamide 6/10, polyamide 6/8, polyamide 6/12, polyamide 4/6, polyamide 11 and polyamide 12.

11. The composition as claimed in claim 1, wherein the polyamide is aromatic.

12. A method of making the composition of claim 11, comprising mixing the polyamide and the antioxidant.

13. The method of claim 12, further comprising extruding the mixture of the polyamide and the antioxidant.

* * * * *